United States Patent
Banin et al.

(10) Patent No.: US 9,215,562 B1
(45) Date of Patent: Dec. 15, 2015

(54) METHOD AND APPARATUS FOR OPTIMIZED INDOOR POSITION ESTIMATION

(71) Applicant: Intel IP Corporation, Santa Clara, CA (US)

(72) Inventors: Leor Banin, Petach Tikva (IL); Yuval Amizur, Kfar-Saba (IL); Uri Schatzberg, Kryat Ono (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/444,270

(22) Filed: Jul. 28, 2014

(51) Int. Cl.
  *G01S 5/02* (2010.01)
  *G01S 19/05* (2010.01)
  *H04W 64/00* (2009.01)
  *H04W 4/02* (2009.01)

(52) U.S. Cl.
  CPC ..................................... *H04W 4/023* (2013.01)

(58) Field of Classification Search
  None
  See application file for complete search history.

(56) References Cited

U.S. PATENT DOCUMENTS

| | | | | |
|---|---|---|---|---|
| 5,629,707 A * | 5/1997 | Heuvel et al. | ............... | 342/357.2 |
| 5,790,073 A * | 8/1998 | Tayloe et al. | ............... | 342/357.2 |
| 6,154,657 A * | 11/2000 | Grubeck et al. | ........... | 455/456.2 |
| 6,442,495 B1 * | 8/2002 | Fleming-Dahl | ................. | 702/69 |
| 6,750,812 B2 * | 6/2004 | Mizugaki et al. | .......... | 342/357.4 |
| 7,489,936 B1 * | 2/2009 | Liu | ............................. | 455/456.1 |
| 7,633,436 B2 * | 12/2009 | Kangas | .................... | 342/357.43 |
| 8,081,689 B2 * | 12/2011 | Ballentin et al. | .............. | 375/260 |
| 8,145,237 B2 * | 3/2012 | Versteeg | .................... | 455/456.1 |
| 8,385,943 B1 * | 2/2013 | Han et al. | .................... | 455/456.1 |
| 8,504,059 B2 * | 8/2013 | Huang et al. | .................. | 455/456.1 |
| 2003/0045305 A1 * | 3/2003 | Ogino et al. | .................. | 455/456 |
| 2003/0060197 A1 * | 3/2003 | Benes et al. | .................. | 455/433 |
| 2004/0063441 A1 * | 4/2004 | Diao et al. | ................. | 455/456.1 |
| 2004/0087316 A1 * | 5/2004 | Caci | ........................... | 455/456.1 |
| 2004/0087317 A1 * | 5/2004 | Caci | ........................... | 455/456.1 |
| 2007/0127422 A1 * | 6/2007 | Belcea | .......................... | 370/338 |
| 2007/0254676 A1 * | 11/2007 | Pedigo et al. | .............. | 455/456.6 |
| 2007/0281712 A1 * | 12/2007 | Povey et al. | .............. | 455/456.1 |
| 2008/0070572 A1 * | 3/2008 | Shkedi | ........................ | 455/435.1 |
| 2010/0120394 A1 * | 5/2010 | Mia et al. | .................... | 455/404.2 |
| 2012/0135750 A1 * | 5/2012 | Lee et al. | ................... | 455/456.1 |
| 2013/0143597 A1 * | 6/2013 | Mitsuya et al. | ............ | 455/456.1 |
| 2014/0200024 A1 * | 7/2014 | Mueck | ........................ | 455/456.1 |
| 2014/0274111 A1 * | 9/2014 | Edge et al. | ................. | 455/456.1 |

* cited by examiner

*Primary Examiner* — Ashish K Thomas
(74) *Attorney, Agent, or Firm* — Salehi Law Group (57) ABSTRACT

The disclosure relates to a method, apparatus and system for optimized indoor position estimation. Specifically, the disclosure relates to indoor position estimation by considering the likelihood that an access point may be an outlier. In one embodiment, the disclosure relates to a system to determine a device location. The system includes one or more antennas; a radio in communication with the at least one or more antennas; a processor to communicate with radio, the processor configured to: measure a distance from the device to a plurality of access points (APs); define a plurality of locations and calculating a distance from each of the plurality of locations to each of the plurality of APs; calculate a measurement error for each of the plurality of the calculated distances; for each location, determine a probability of measurement error as a function of both presence and absence of an outlier AP; for each location, sum the probability of measurement errors for the plurality of APs; and select the location with the highest probability of measurement error sum as an estimated device location.

25 Claims, 9 Drawing Sheets

METHOD AND APPARATUS FOR OPTIMIZED INDOOR POSITION ESTIMATION

BACKGROUND

1. Field

The disclosure relates to a method, apparatus and system for optimized indoor position estimation. Specifically, the disclosure relates to indoor position estimation by considering the probability that an access point may be an outlier.

2. Description of Related Art

Outdoor navigation is widely deployed due to advancement in various global positioning systems (GPS). Recently, there has been an increased focus on indoor navigation and position location. Indoor navigation differs from the navigation because the indoor environment precludes receiving GPS satellite signals. As a result, effort is now directed to solving the indoor navigation problem. This problem does not have a scalable solution with satisfactory precision.

A solution to this problem may be based on the Time-of-Flight (ToF) method. ToF is defined as the overall time a signal propagates from the user to an access point (AP) and back to the user. This value can be converted into distance by dividing the signal's roundtrip travel time by two and multiplying it by the speed of light. This method is robust and scalable but requires significant hardware changes to the Wi-Fi modem and other devices. The ToF range calculation depends on determining the precise signal receive/transmit times. As little as 3 nanoseconds of discrepancy will result in about 1 meter of range error. Conventional ToF range measurements also require significant processing bandwidth.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12-TGac Channel Model Addendum Document"); IEEE 802.11 task group ad (TGad) (IEEE 802.11ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HD™ specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Outdoor navigation has been widely deployed due to the development of various systems including: global-navigation-satellite-systems (GNSS), GPS, Global Navigation Satellite System (GLONASS) and GALILEO. Indoor navigation has been receiving considerable attention. Indoor navigation differs from the outdoor navigation since the indoor environment is not capable of receiving signals from GNSS satellites. As a result, conventional techniques do not offer a scalable solution with acceptable precision.

In one embodiment of the disclosure, ToF measurements are used to address indoor navigation and position determination. As discussed, ToF is defined as the overall time a signal propagates from the user to an access point (AP) and back to the user. This ToF value can be converted into distance by dividing the time by two and multiplying it by the speed of light. The ToF method is robust and scalable but may require hardware changes to the existing Wi-Fi modems. While ToF measurement is capable of high accuracy range measurements (i.e. with small error) most of the time, it is susceptible to high error. The error is typically due to the environment topography or surroundings structures that cause signal blockage between the device and the AP.

Conventional position estimation algorithms assume that the measurement error is normally distributed; that is, they assume Gaussian distribution of white noise. Under these assumptions, conventional estimation techniques such as least square algorithm may contain significant error. The conventional techniques do not consider the outlier measurements because such measurements do not behave as statistically expected. Consequently, the position estimation shows drift in one or more directions. Since the outlier is environment-dependent, the noise is unlikely to go away with time unless the device changes its position.

In one embodiment of the disclosure, the probability that an access point (AP) may or may not be an outlier is considered during device position estimation. That is, the position estimation embodiments consider the probability that an AP may be an outlier and weigh the position estimation based on the outlier AP accordingly. By not assuming that the measurement error is Gaussian, a maximum likelihood (ML) position can be estimated.

The ML algorithm selects the most likely or the most probable solution. In one embodiment, the algorithm calculates the location probability for all grid points and selects the highest peak (most likely peak). In contrast, conventional algorithms (Least Square Error, LS) considers all APs and is not configured to search-and-find maximum likelihood locations. In another embodiment, methods are disclosed to reduce computational complexity associated with ML estimations. The disclosed embodiments significantly reduce positional estimation error caused by outliers while reducing computational complexity.

Figure 1:
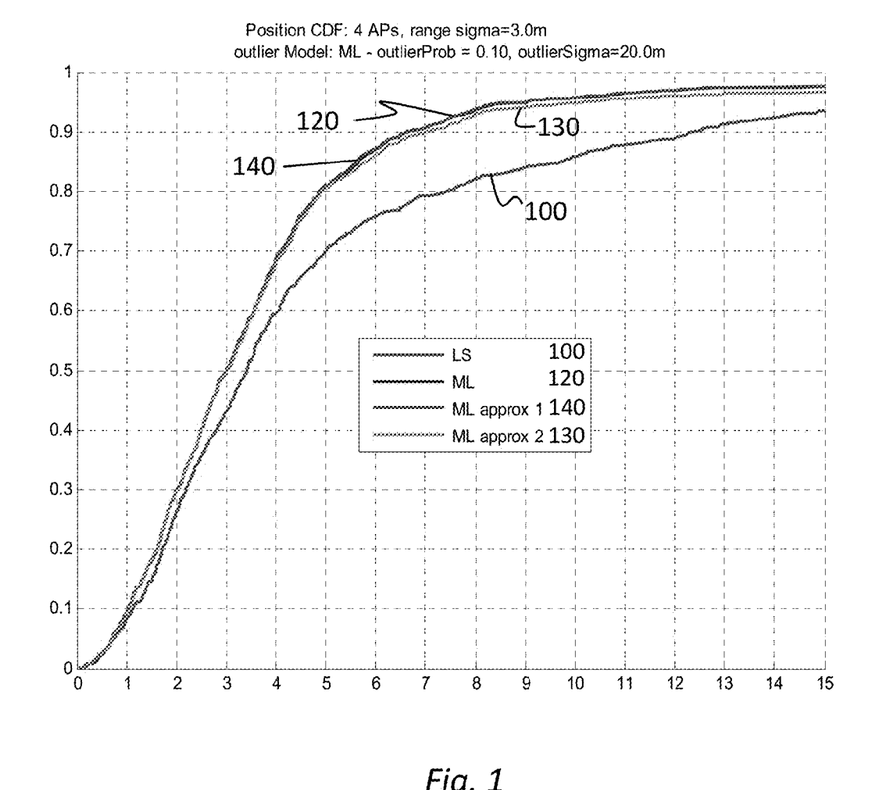
FIG. 1 shows simulation results for different probability calculation values.

FIG. 1 shows simulation results for different position calculation values. Namely, FIG. 1 shows the cumulative distribution function (CDF) of the position estimation error for a wireless device. The wireless device is configured to communicate with four APs for indoor non-Line-Of-Sight (nLOS) channels. The distance estimation error from the wireless device and each AP includes Gaussian distribution with 3 m sigma. Additionally, the simulation includes an outlier distance error with Gaussian distribution of 20 m sigma from the wireless device. The probability of having an outlier AP is set to 10%.

In FIG. 1, the X-axis shows error in meters and the Y-axis show the percentage of measurements with position error less than X (the probability of error being lower than X). FIG. 1 shows significant errors associated with both the ML and the Least Square (LS) methods. Specifically, FIG. 1 shows improvement of accuracy at the 90 percentile from 12 m to 7 m as well as improved robustness. In FIG. 1, the ML line continues to climb to about 98-99$^{th}$ percentile, while the LS line fails to reach the last 5%, stuck at 95% even with 15 m error. Thus ML is more robust, as it can provide satisfactory position in nearly 100% of the time in FIG. 1.

Figure 2:
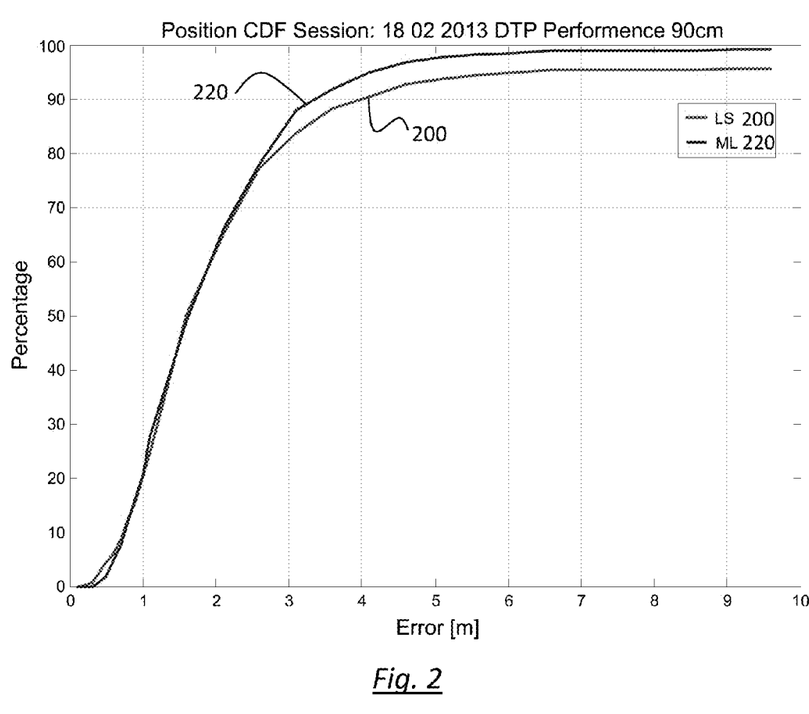
FIG. 2 shows the results from an actual measurement comparing cumulative distribution function (CDF) for LS and ML methods.

FIG. 2 shows the results from an actual measurement comparing cumulative distribution function (CDF) for LS and ML methods. As in FIG. 1, the X-axis shows the distance error in meters and the Y-axis shows the probability of error. The LS function is shown as line 200 and the MS function is shown as line 220.

Accurate indoor position estimation requires several range measurements. Each range measurement is the distance between the wireless device seeking its position and known APs. The range may be measured using conventional ToF techniques. Position estimation is a non-linear problem with an approximate solution determined by iterative LS calculation.

In an embodiment, range measurement can be defined as $\{y_1, y_2, \ldots y_N\}$, where $y_i = r_i + n_i$; where $r_i$ is the true range to $AP_i$ and $n_i$ is the additive noise. Conventional solutions for range measurement and location determination assume that n is white Gaussian noise. Using the LS algorithm, conventional methods identify a location where Equation (1) is at minimum:

$$\text{Mean Square Error(MSE)} = 1/N^*([y_1 - m_1]^2 + [y_2 - m_2]^2 \ldots + [y_N - m_N]^2) \quad (1)$$

In Equation (1) $m_i$ is the range from the estimated position to $AP_i$. As long as the noise is Gaussian, the algorithm is optimal. However, in reality range measurement error are not Gaussian and exhibit outlier behavior due to surrounding conditions.

Figure 3:
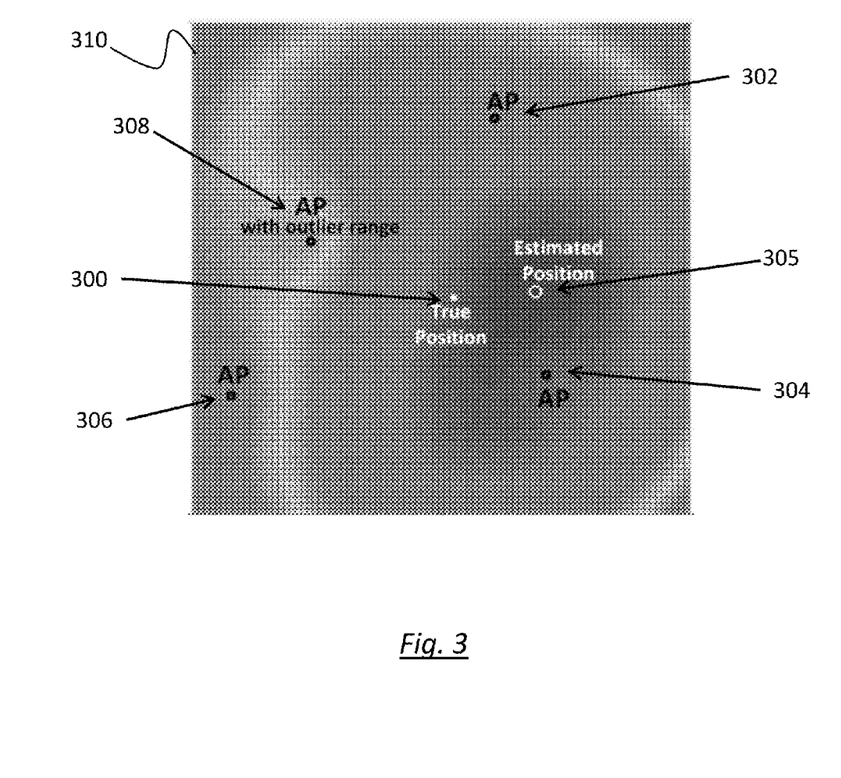
FIG. 3 shows a probability distribution map for an indoor location using LS method and assuming Gaussian range error or noise.

FIG. 3 shows a probability distribution map for an indoor location using LS method and assuming Gaussian range error or noise. Specifically, FIG. 3 shows the probability of being at each indoor location. The darker shades at the center of FIG. 3 (e.g., locations identified by 304, 305 and 320) indicate a high probability (i.e., low MSE value) of presence. Lighter shades (e.g., locations 302, 306 and 308) at the periphery indicates low probability (i.e., high MSE value). FIG. 3 assumes that the range measurements suffer from Gaussian noise. Thus, the LS estimator was used to determine the probability. While not use in FIG. 3, received signal strength indicator (RSSI) values may also be used in forming a probability distribution map.

In FIG. 3, APs 302, 304 and 306 are within range of the wireless device 300. AP 308 is an outlier. Put differently, APs 302, 304 and 306 provide good range measurement while AP 308 provides an unexpectedly large range measurement. Grid 310 was formed over the map of FIG. 3. An MSE calculation was done for each location on grid 310. Each location was shaded depending on whether the location had high position probability assuming the range contained additive white Gaussian noise. Selecting a grid location with the minimal square error (best fit to measurement, shown in dark red), according to conventional algorithm results in significant offset (estimated position 305) from true position 300. It should be noted that while grid 310 is uniform, the discloses embodiments are not limited thereto and the grid density may not be homogenous.

Figure 4:
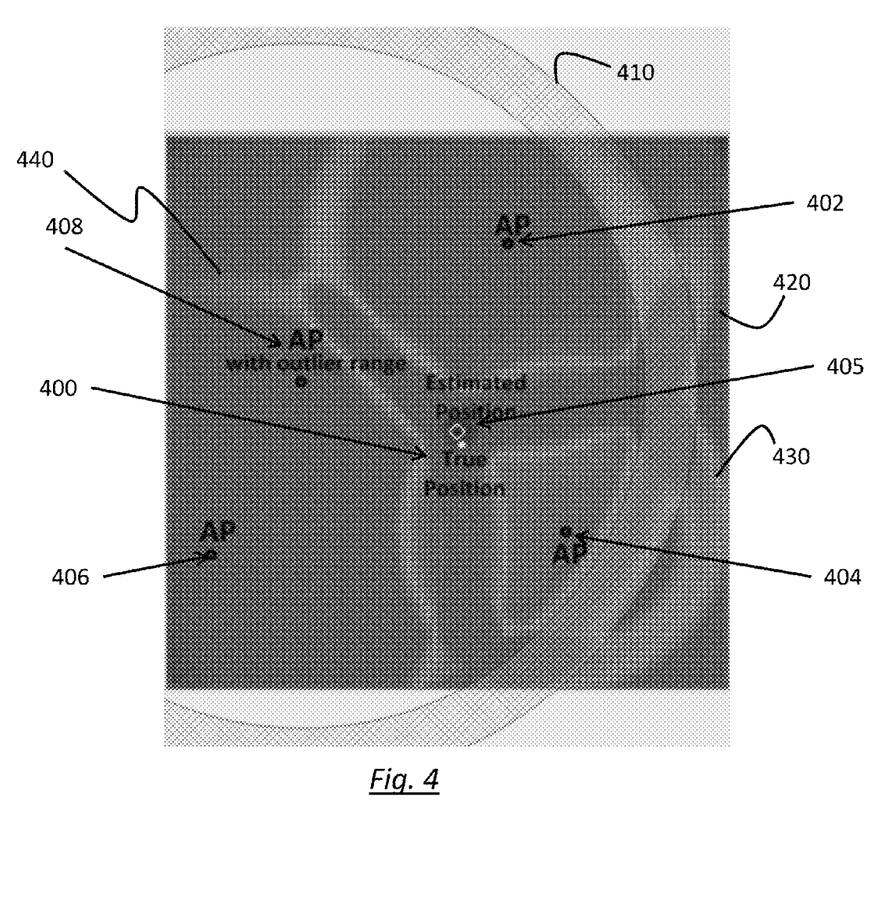
FIG. 4 shows the probability distribution map for the indoor location of FIG. 3 using the ML probability distribution for non-Gaussian range error/noise calculation.

FIG. 4 shows the probability distribution map for the indoor location of FIG. 3 using the ML probability distribution for non-Gaussian range error/noise calculation. As in FIG. 3, the FIG. 4 embodiment shows APs 402, 404 and 406 in direct communication with the wireless device. The signal from AP 408 is attenuated thereby creating an outlier signal. Because of the attenuation, the estimated distance between the device and the AP is assumed to be much larger than it would be otherwise. The range error is reflected in circle 410 having a radius determined by ToF measurement.

Similar estimation is made for each of APs 402, 404 and 406, thereby creating circles 420, 430 and 440, respectively. The circles represent the probability of the position given a range measurement. That is, there is a high position probability on each circle's radius which is equal the ToF range measurement. The probability radially changes as the radius get smaller or bigger. FIG. 4 combines all 4 PDF calculations. Since the ML determination uses a better probability distribution function (as compared to using Gaussian noise which produces FIG. 3), the circles are visible.

In FIG. 4, grid locations on circles 420, 430 and 440 are additionally shaded according to probability of closeness to the actual device position. Grid locations in lighter shades (e.g., 402, 404 and 405) denote locations having the highest probability of being the device position. It can be readily seen from FIG. 4 that estimating device position is greatly enhanced by excluding outlier AP 406.

In an exemplary embodiment, RSSI values may be considered to determine signal strength. In another embodiment, the RSSI values may be used to generate probability data that can be added to the gird.

Thus, an embodiment of the disclosure minimizes error by ignoring the outlier AP from position calculation. A method according to one embodiment of the disclosure includes the steps of: defining a search region, defining position hypotheses grid within the region, calculating the probability of each hypothesis, and finding the hypothesis with the maximum likelihood probability (e.g., ML).

Figure 5:
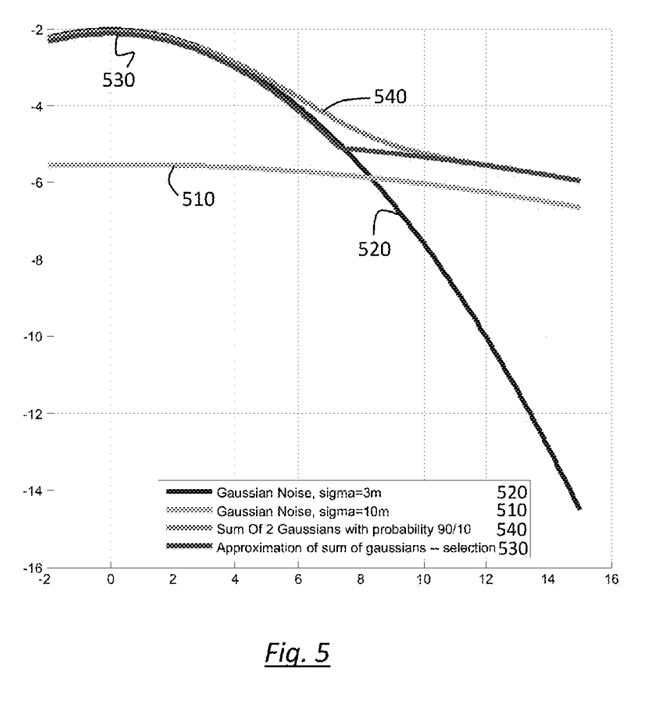
FIG. 5 shows the Gaussian probability density function (PDF) and non-Gaussian PDF for range error/noise.

FIG. 5 shows the Gaussian probability density function (PDF) and non-Gaussian PDF for range error/noise. Specifically, FIG. 5 shows different pdf of the range errors where X is meters and Y is the log(pdf). Line 510 is the PDF of normal distribution (Gaussian noise) where sigma is 10 m. Lines 520 is the PDF of normal distribution (Gaussian noise) where sigma is 3 m. Line 540 is the sum of lines 510 and 520 according to Equation (2) below. Line 530 is an approximation of line 540 and is selecting between lines 510 and 520 as a function of X (X refer to x-axis (FIG. 5) or distance, but may be replaced by "err" for clarity):

$$\log(p1*fN(\text{err},\text{sig1})+(1-p1)*2*fN(\text{err},\text{sig2})) \quad (2)$$

In Equation (2), p1 is the probability of not having an outlier (in this example, 0.9); (1−p1) is the probability oft the AP being an outlier; sig1 is the Gaussian noise sigma in case there is no outlier (i.e., 3 m); sig2 is the Gaussian noise sigma in case there is an outlier (i.e., 10 m), and fN is the distribution function of a Gaussian variable (expectation=0).

In Equation (2) some approximation can be done to reduce calculation, for example, by removing the exponent and log functions:

$$\text{if abs}(\text{err}) < \text{threshold} \quad (3)$$

$$\log(p1*fN(\text{err},\text{sig1})), \text{else} \quad (4)$$

$$(1-p1)*2*fN(\text{err},\text{sig2})) \quad (5)$$

Which is the same as:

$$\text{if abs}(\text{err}) < \text{threshold} \quad (6)$$

$$a1*\text{err}^2+c1, \text{else} \quad (7)$$

$$a2*\text{err}^2+c2 \quad (8)$$

where a1, a2, c1 and c2 are pre-calculated constant functions of sig1, sig2 and p1. The threshold is defined at the point of functions crossing and the pre-calculated constants of Equation 8 may be determined by the following relationships:

$$a1=-1/2/\text{sig1}^2 \quad (8.1)$$

$$c1=\log(1/\text{sqrt}(2*pi)/\text{sig1})+\log(p1) \quad (8.2)$$

$$a2==-1/2/\text{sig2}^2 \quad (8.3)$$

$$c2=\log(1/\text{sqrt}(2*pi)/\text{sig2})+\log(1-p1)+\log(2) \quad (8.4)$$

$$\text{threshold}=\text{sqrt}((c2-c1)/(a1-a2)) \quad (9)$$

$$fN(x,\text{sig})=1/\text{sqrt}(2*pi)/\text{sig}*\exp(-(x^2)/2/\text{sig}^2) \quad (10)$$

The result of calculating the probability function according to ML Equations (3)-(10) is that the if an AP is outlier, its contribution to the signal little contribution to the probability consideration.

In another embodiment, additional measurement (e.g., RSSI values) may be included in the consideration so as to have ToF/RSSI hybrid position estimation. In still another embodiment, region selection (e.g., circles 420, 430 add 440) selection and hypotheses definition can be done in iterative manner to reduce calculation. To accommodate the surroundings, the regions may have any shape, including 3D shapes. The region(s) and the grid may depend on map information (e.g., topographic and structural limitations) of the area. Further, the region(s) and grid may depend on prior knowledge of likely device locations. In still another embodiment, the probability function may be different for each AP and for each estimation.

Figure 6:
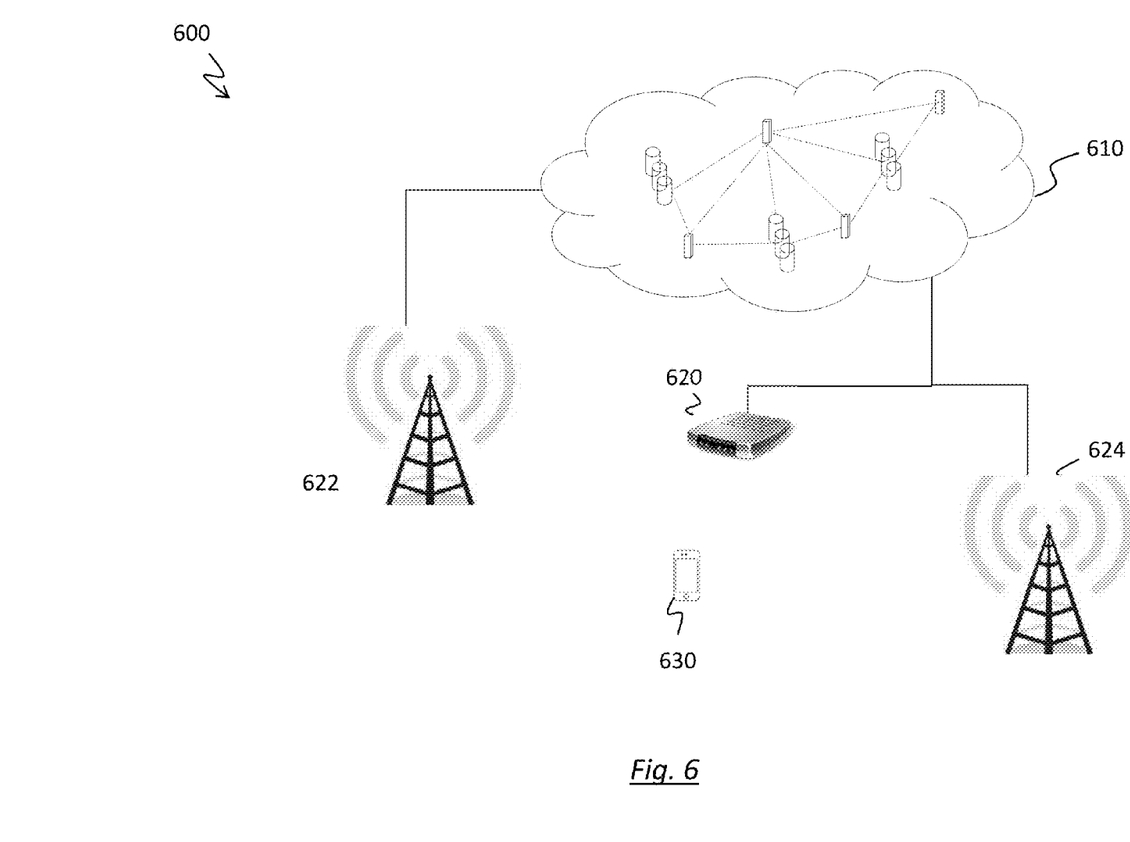
FIG. 6 shows an exemplary environment for implementing an embodiment of the disclosure.

FIG. 6 shows an exemplary environment for implementing an embodiment of the disclosure. Environment 600 includes APs 620, 622 and 624. Mobile device 630 may communicate with APs 620, 622 and 624. Each AP 620, 622 and 624 communicates with internet backbone 610. One of APs 620, 622 and 624 may define an outlier AP. Internet backbone 610 may include one or more cloud servers. Mobile device 630 may be any wireless device and environment 600 may define an indoor or an outdoor environment. Device 630 may use one or more of APs 620, 622 and 624 to self-locate in accordance with the disclosed embodiments.

Figure 7:
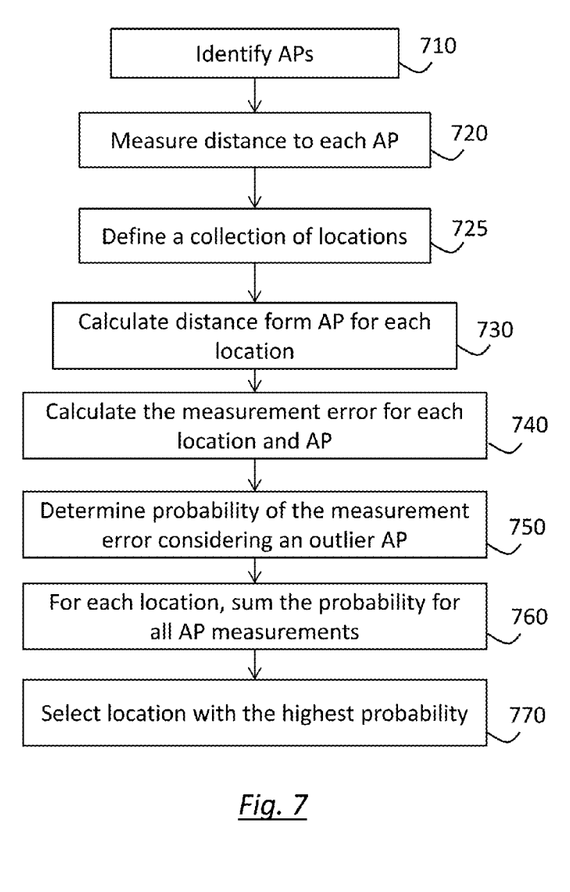
FIG. 7 shows a flow diagram showing an exemplary method for locating a wireless device in an environment.

FIG. 7 shows a flow diagram showing an exemplary method for locating a wireless device in an environment. The method shown in FIG. 7 may be applied, for example, to environment 600 of FIG. 6. The flow diagram starts at step 710 where the mobile device identifies a plurality of APs. A step 710, the device measures the distance to each AP. The distance may be measured, for example, by using the ToF technique. At step 725, a collection of possible locations are defined. In one embodiment of the disclosure, a collection of possible locations defines a grid covering all or part of the wireless environment. At step 730, the distance from the AP is calculated for each location. In an exemplary embodiment where the locations define a gird, the distance to each AP is calculated for each grid location.

At step 740, the measurement error is calculated for each location and AP. Conventional algorithms for calculating the measurement error may be used. At step 750, the probability of measurement error considering an outlier error is calculated. That is, the probability of measurement error is calculated based on the likelihood that an outlier AP does or does not exist. Step 750 is repeated for each combination of location and AP. Next, for each location the probabilities determined at step 750 is obtained (see step 760). Finally, at step 770, the location with the highest probability (the ML position) is selected from among the probability values determined at step 760.

Figure 8:
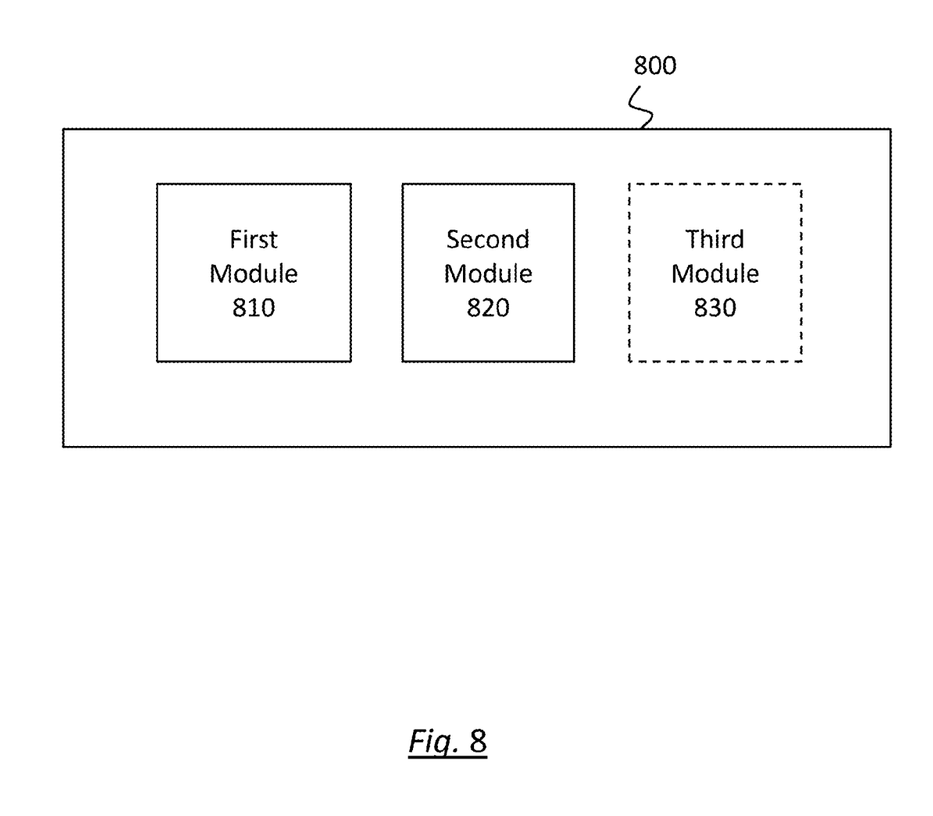
FIG. 8 schematically illustrates an exemplary device for implementing an embodiment of the disclosure.

FIG. 8 schematically illustrates an exemplary device for implementing an embodiment of the disclosure. Device 800 includes first module 810, second module 820 and optional third module 830. Modules 810, 820 and 830 can be hardware, software, firmware or any combination thereof. Further, each of modules 810, 820 and 830 may define one or more independent processor circuits. In an exemplary embodiment, at least one of the modules includes a processor circuitry and a memory circuitry in communication with each other. In another embodiment, modules 810, 820 and 830 define different parts of the same integrated data processing circuit. In still another exemplary embodiment, device 800 may be integrated with an AP or with a mobile platform.

Device 800 may be integrated with an existing IEEE 802.11 system having multiple radios and one or more antennas. For example, device 800 may be configured to estimate location of a device seeking its location in an indoor or outdoor environment. The device may be a wireless device having one or more platforms. In another embodiment, device 800 may be remote from the wireless device but communicate with the device. Device 800 may be configured to implement the flow diagram of FIG. 8 and/or apply the disclosed algorithms.

In an exemplary implementation, first module 810 is configured to identify a plurality of APs in relation to the mobile device. The APs may be within signal reach of the mobile device. Each AP may be an outlier AP. First module 810 may also be configured to measure a distance from the device to each AP. A conventional measurement technique such as ToF may be used for measurement purposes. Other techniques, for example, known prion knowledge of the AP location may also be used. First module 810 may also be configured to define a collection of possible locations within the environment and, for each location, calculate the distance from each AP.

Second module 820 may communicate directly with first module 810. Second module 820 may be configured to calculate the measurement error for each location. The measurement error may be defined as a comparison between the calculated distance and the measured distance. Module 820 may also determine, for each location, the probability of measurement error considering an outlier AP. That is, the probability that the AP is/not may be considered. Both probabilities (P and P−1) may be considered by the second module.

Optional third module 830 may be used in conjunction with the first and the second modules. Alternatively, the processes implemented at third module 830 may be combined with one or both of the first and the second modules. Module 830 may be configured to sum up the probabilities for all AP measurements for each location and to select a location with the highest probability as the most likely position.

Figure 9:
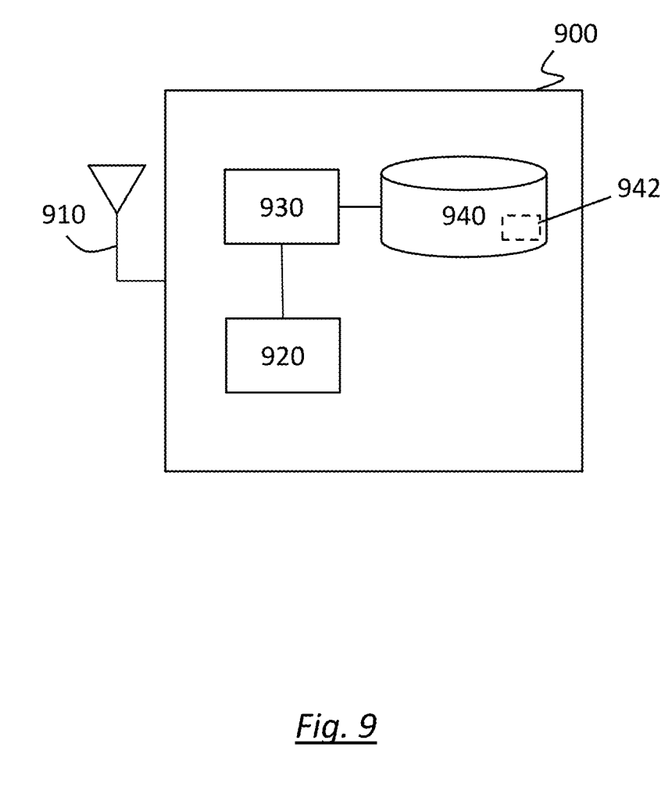
FIG. 9 schematically shows a system for implementing one embodiment of the disclosure.

FIG. 9 schematically shows a system for implementing one embodiment of the disclosure. For example, the steps of any of disclosed implementations may be implemented at the system of FIG. 9. System 900 of FIG. 9 may define a mobile device such as a wireless station (STA), smartphone, an AP, a tablet or any device capable of wireless communication. While system 900 is shown with antenna 910, the disclosure is not limited to having one antenna. Multiple antennas can be added to system 900 such that different signals having different protocols can be received by the different antennas.

The signal(s) received at antenna 910 are relayed to radio 920. Radio 920 may include transceiver components such as front-end receiver components or a receiver/transmitter. Though not shown, radio 910 may include multiple radios. Radio 920 may convert analog (RF) signals to one or more digital data stream and direct the data stream(s) to processor 930. Processor 930 may include one or more modules (not shown) as well as an optional controller module (not shown). Processor 930 may also communicate with memory circuit 940. While shown as a separate circuitry in the exemplary system of FIG. 9, it should be noted that instructions 942 may be embedded on processor 930 as firmware to obviate the need for memory circuit 940.

Memory circuit 940 may contain instructions 942 for processor 930 to implement one or more of the steps of the exemplary methods disclosed herein. In an exemplary embodiment, memory circuit 940 may define a non-transitory computer readable medium containing a set of instructions to processor 930 to perform a process to determine most likely location of a mobile device with respect to one or more APs. One or more of the APs may define an outlier. In one embodiment, the instructions direct the processor to: measure a distance from the device to a plurality of access points (APs); define a plurality of locations and calculating a distance from each of the plurality of locations to each of the plurality of APs; calculate a measurement error for each of the plurality of the calculated distances; for each location, determine a probability of measurement error as a function of both presence and absence of an outlier AP; for each location, sum the probability of measurement errors for the plurality of APs; and select the location with the highest probability of measurement error sum as an estimated device location.

The following examples pertain to further embodiments of the disclosure. Example 1 is directed to a system to estimate location of a mobile device, comprising: one or more antennas; a radio in communication with the at least one or more antennas; a processor to communicate with radio, the processor configured to: measure a distance from the mobile device to a plurality of access points (APs) and calculate a distance from a plurality of identified locations to each of the plurality of APs; calculate a measurement error for each of the plurality of the calculated distances and determine a probability of measurement error as a function of both presence and absence of an outlier AP for each location; and sum the probability of measurement errors for the plurality of APs for each location, and to select the location with the highest probability of measurement error sum.

The following examples pertain to further embodiments of the disclosure. Example 1 relates to a system to estimate location of a mobile device. The system comprises: one or more antennas; a radio in communication with the at least one or more antennas; a processor to communicate with radio, the processor configured to: measure a distance from the mobile device to a plurality of access points (APs); calculate a distance from each of a plurality of identified locations to each of the plurality of APs; calculate a measurement error for each of the plurality of the calculated distances; for each of the calculated measurement errors determine a probability of measurement error as a function of both presence and absence of an outlier AP for each location; sum the probability of measurement errors for each of the plurality of APs for each location; and select the location with the highest probability of measurement error sum.

Example 2 relates to the system of example 1, wherein the processor module is further configured to conduct a Time of Flight (ToF) measurement between the device and at least one AP.

Example 3 relates to the system of example 1, wherein the processor module is further configured to retrieve a distance measurement between the device and at least one AP from a database.

Example 4 relates to the system of example 1, wherein the processor module is further configured to select the plurality of identified locations and wherein each location is reached by an AP signal.

Example 5 relates to the system of example 1, wherein the processor module is further configured to define a global region to include each of the plurality of locations and each of the plurality of APs.

Example 6 relates to the system of example 1, wherein the processor module is further configured to calculate the measurement error for one of the plurality of APs by comparing the calculated distance with an actual distance.

Example 7 relates to the system of example 1, wherein the processor is further configured to determine the probability of the measurement error for each location and each AP.

Example 8 relates to a location estimation device, comprising: a first processor module configured to measure a distance from a mobile device to a plurality of access points (APs) and to calculate a distance from a plurality of identified locations to each of the plurality of APs; a second processor module configured to calculate a measurement error for each of the plurality of the calculated distances and to determine a probability of measurement error as a function of both presence and absence of an outlier AP for each location; and a third processor module to sum the probability of measurement errors for the plurality of APs for each location and to select the location with the highest probability of measurement error sum.

Example 9 relates to the location estimation device of example 8, wherein the first processor module is further configured to conduct a Time of Flight (ToF) measurement between the mobile device and at least one AP.

Example 10 relates to the location estimation device of example 8, wherein the first processor module is further configured to retrieve a distance measurement between the mobile device and at least one AP from a database.

Example 11 relates to the location estimation device of example 8, wherein the first processor module is further configured to select the plurality of identified locations and wherein each location is reached by an AP signal.

Example 12 relates to the location estimation device of example 8, wherein the first processor module is further configured to define a global region to include each of the plurality of locations and each of the plurality of APs.

Example 13 relates to the location estimation device of example 8, wherein the second processor module is further configured to calculate the measurement error for one of the plurality of APs by comparing the calculated distance with an actual distance.

Example 14 relates to the location estimation device of example 8, wherein the second processor module is further configured to determine the probability of the measurement error for each location and each AP.

Example 15 relates to a method to estimate location of a mobile device, the method comprising: measuring a distance from the mobile device to each of a plurality of access points (APs); defining a plurality of locations and calculating a distance from each of the plurality of locations to each of the plurality of APs; calculating a measurement error for each of the plurality of the calculated distances; for each location, determining a probability of measurement error as a function of both presence and absence of an outlier AP; for each location, summing the probability of measurement error for each of the plurality of APs; and selecting the location with the highest probability of measurement error sum as an estimated mobile device location.

Example 16 relates to the method of example 15, further comprising conducting a Time of Flight (ToF) measurement between the device and at least one AP.

Example 17 relates to the method of example 15, further comprising retrieving the distance between the mobile device and at least one AP from a database.

Example 18 relates to the method of example 15, wherein defining a plurality of locations further comprises defining locations reached by at least one AP signal.

Example 19 relates to the method of example 15, further comprising defining a global region to include each of the plurality of locations and the plurality of APs.

Example 20 relates to the method of example 15, further comprising calculating the measurement error for one of the plurality of APs by comparing the calculated distance with a measured distance.

Example 21 relates to the method of example 15, further comprising determining the probability of the measurement error for each location and each AP.

Example 22 relates to a non-transitory computer-readable storage device having a set of instructions to cause a processor to perform a process comprising: measure a distance from the device to a plurality of access points (APs); define a plurality of locations and calculate a distance from each of the respective plurality of locations to each of the plurality of APs; calculate a measurement error for each of the plurality of the calculated distances; for each location, determine a probability of measurement error as a function of both presence and absence of an outlier AP; for each location, sum the probability of measurement errors for the plurality of APs; and select a location with the highest probability of measurement error sum as an estimated device location.

Example 23 relates to the non-transitory computer readable storage device of example 22, wherein the instructions further cause the processor to conduct a Time of Flight (ToF) measurement between the device and at least one AP.

Example 24 relates to the non-transitory computer readable storage device of example 22, wherein the instructions further cause the processor to retrieve the distance between the device and at least one AP from a database.

Example 25 relates to the non-transitory computer readable storage device of example 22, wherein defining a plurality of locations further comprises defining locations reached by at last one AP signal.

While the principles of the disclosure have been illustrated in relation to the exemplary embodiments shown herein, the principles of the disclosure are not limited thereto and include any modification, variation or permutation thereof.

What is claimed is:

1. A system to estimate location of a mobile device, comprising:

one or more antennas;
a radio in communication with the at least one or more antennas;
a processor to communicate with radio, the processor configured to:
measure a distance from the mobile device to a plurality of access points (APs);
calculate a distance from each of a plurality of identified locations to each of the plurality of APs;
calculate a measurement error for each of the plurality of the calculated distances;
for each of the calculated measurement errors determine a probability of measurement error as a function of both presence and absence of an outlier AP for each location;
sum the probability of measurement errors for each of the plurality of APs for each location; and
select the location with the highest probability of measurement error sum.

2. The system of claim 1, wherein the processor module is further configured to conduct a Time of Flight (ToF) measurement between the device and at least one AP.

3. The system of claim 1, wherein the processor module is further configured to retrieve a distance measurement between the device and at least one AP from a database.

4. The system of claim 1, wherein the processor module is further configured to select the plurality of identified locations and wherein each location is reached by an AP signal.

5. The system of claim 1, wherein the processor module is further configured to define a global region to include each of the plurality of locations and each of the plurality of APs.

6. The system of claim 1, wherein the processor module is further configured to calculate the measurement error for one of the plurality of APs by comparing the calculated distance with an actual distance.

7. The system of claim 1, wherein the processor is further configured to determine the probability of the measurement error for each location and each AP.

8. A location estimation device, comprising:
a first processor module configured to measure a distance from a mobile device to a plurality of access points (APs) and to calculate a distance from a plurality of identified locations to each of the plurality of APs;
a second processor module configured to calculate a measurement error for each of the plurality of the calculated distances and to determine a probability of measurement error as a function of both presence and absence of an outlier AP for each location; and
a third processor module to sum the probability of measurement errors for the plurality of APs for each location and to select the location with the highest probability of measurement error sum.

9. The location estimation device of claim 8, wherein the first processor module is further configured to conduct a Time of Flight (ToF) measurement between the mobile device and at least one AP.

10. The location estimation device of claim 8, wherein the first processor module is further configured to retrieve a distance measurement between the mobile device and at least one AP from a database.

11. The location estimation device of claim 8, wherein the first processor module is further configured to select the plurality of identified locations and wherein each location is reached by an AP signal.

12. The location estimation device of claim 8, wherein the first processor module is further configured to define a global region to include each of the plurality of locations and each of the plurality of APs.

13. The location estimation device of claim 8, wherein the second processor module is further configured to calculate the measurement error for one of the plurality of APs by comparing the calculated distance with an actual distance.

14. The location estimation device of claim 8, wherein the second processor module is further configured to determine the probability of the measurement error for each location and each AP.

15. A method to estimate location of a mobile device, the method comprising:
measuring a distance from the mobile device to each of a plurality of access points (APs);
defining a plurality of locations and calculating a distance from each of the plurality of locations to each of the plurality of APs;
calculating a measurement error for each of the plurality of the calculated distances;
for each location, determining a probability of measurement error as a function of both presence and absence of an outlier AP;
for each location, summing the probability of measurement error for each of the plurality of APs; and
selecting the location with the highest probability of measurement error sum as an estimated mobile device location.

16. The method of claim 15, further comprising conducting a Time of Flight (ToF) measurement between the device and at least one AP.

17. The method of claim 15, further comprising retrieving the distance between the mobile device and at least one AP from a database.

18. The method of claim 15, wherein defining a plurality of locations further comprises defining locations reached by at least one AP signal.

19. The method of claim 15, further comprising defining a global region to include each of the plurality of locations and the plurality of APs.

20. The method of claim 15, further comprising calculating the measurement error for one of the plurality of APs by comparing the calculated distance with a measured distance.

21. The method of claim 15, further comprising determining the probability of the measurement error for each location and each AP.

22. A non-transitory computer-readable storage device having a set of instructions to cause a processor to perform a process comprising:
measure a distance from the device to a plurality of access points (APs);
define a plurality of locations and calculate a distance from each of the respective plurality of locations to each of the plurality of APs;
calculate a measurement error for each of the plurality of the calculated distances;
for each location, determine a probability of measurement error as a function of both presence and absence of an outlier AP;
for each location, sum the probability of measurement errors for the plurality of APs; and
select a location with the highest probability of measurement error sum as an estimated device location.

23. The non-transitory computer readable storage device of claim 22, wherein the instructions further cause the processor to conduct a Time of Flight (ToF) measurement between the device and at least one AP.

24. The non-transitory computer readable storage device of claim 22, wherein the instructions further cause the processor to retrieve the distance between the device and at least one AP from a database.

25. The non-transitory computer readable storage device of claim 22, wherein defining a plurality of locations further comprises defining locations reached by at last one AP signal.

* * * * *